US007350883B2

(12) United States Patent
Hubbard et al.

(10) Patent No.: US 7,350,883 B2
(45) Date of Patent: Apr. 1, 2008

(54) DETECTING ELEVATOR BRAKE AND OTHER DRAGGING BY MONITORING MOTOR CURRENT

(75) Inventors: James L. Hubbard, Kensington, CT (US); Armando Servia-Reymundo, Madrid (ES); Michael Mann, Berlin (DE)

(73) Assignee: Otis Elevator Company, Farmington, CT (US)

( * ) Notice: Subject to any disclaimer, the term of this patent is extended or adjusted under 35 U.S.C. 154(b) by 256 days.

(21) Appl. No.: 10/523,608

(22) PCT Filed: Oct. 15, 2002

(86) PCT No.: PCT/US02/32896

§ 371 (c)(1),
(2), (4) Date: Sep. 25, 2005

(87) PCT Pub. No.: WO2004/035448

PCT Pub. Date: Apr. 29, 2004

(65) Prior Publication Data

US 2006/0175153 A1 Aug. 10, 2006

(51) Int. Cl.
*B60T 8/32* (2006.01)

(52) U.S. Cl. .................. 303/191; 187/393; 188/1.11 E

(58) Field of Classification Search ................ 303/191; 188/1.11 E; 187/288, 276, 393 X, 281, 283, 187/302, 391

See application file for complete search history.

(56) References Cited

U.S. PATENT DOCUMENTS

| | | | | |
|---|---|---|---|---|
| 4,898,263 | A * | 2/1990 | Manske et al. | 187/247 |
| 4,928,021 | A * | 5/1990 | Yonemoto | 187/288 |
| 4,982,815 | A * | 1/1991 | Arabori et al. | 187/288 |
| 5,050,709 | A * | 9/1991 | Okumura et al. | 187/293 |
| 5,241,255 | A * | 8/1993 | Oshima et al. | 318/801 |
| 5,686,707 | A * | 11/1997 | Iijima | 187/291 |
| 5,765,664 | A * | 6/1998 | Herkel et al. | 187/393 |
| 6,283,252 | B1 * | 9/2001 | Lee | 187/291 |
| 6,325,179 | B1 | 12/2001 | Barreiro et al. | |
| 6,422,350 | B1 * | 7/2002 | Erker | 187/277 |

* cited by examiner

*Primary Examiner*—Robert A. Siconolfi
*Assistant Examiner*—Mariano Sy

(57) ABSTRACT

Elevator brake or other drag is checked by establishing (10-13) baseline motor currents at plural determined positions as the car is moved up and down both empty and with full load. In a normal run (21), the load is recorded (22) and the motor current required to drive the load at rated speed at the next determined position is both predicted (28) and measured. If the difference between the predicted and actual current exceeds a tolerance (33, 34), the car stops at the next floor (35), the system is shut down (39) and a message generated (40). When the brake is in proper operating condition, baseline motor current required to move a car with the brake engaged is recorded. Thereafter, a high fraction (such as 90%) of baseline motor current is applied to attempt to move the car. If the car moves, the system is shut down (101) and a message generated (102).

9 Claims, 3 Drawing Sheets

DETECTING ELEVATOR BRAKE AND OTHER DRAGGING BY MONITORING MOTOR CURRENT

TECHNICAL FIELD

This invention detects when there is elevator brake roller guide or other drag, or when the brake torque is inadequate, by comparing motor current to that which is to be expected under current operating conditions and by determining motion of the elevator with the brake engaged when being driven by a current less than that which should be required to do so, respectively.

BACKGROUND ART

To determine if elevator brakes are operating properly, it is known to use hardware elements such as microswitches and proximity sensors on the elevator brake to directly monitor the mechanical movement and/or position of the brake shoes or pads. Frequently, these sensors are less reliable than the brake itself and therefore cause false indications of brake discrepancy, resulting in unnecessary shutdown of the elevator. Thus, in addition to the initial cost of the switches and/or sensors, there is the additional cost associated with service calls and replacement of the switches and sensors.

Heretofore, the only check on the torque capability of the elevator brake has been provided by inferring the brake condition from the switches and sensors that determine the degree of motion and position of the brake, when it is in the engaged position. However, only the most flagrant malfunctions are detectable in this way. Other malfunctions such as aging of roller guides, can cause undesired drag on the elevator, and the detection of such is advantageous.

DISCLOSURE OF INVENTION

Objects of the invention include reducing costs and improving reliability of an elevator by elimination of switches and sensors on the elevator brake which are used to monitor the mechanical movement and/or position of the brake shoes or pads. Other objects include providing an improved method for sensing elevator brake and other drag; providing an elevator brake monitoring system which is at least as reliable as the elevator brake itself; and providing improved checking of elevator brake torque capability.

According to the present invention, elevator brake and other elevator component drag, such as roller guide drag, is determined by comparing the motor current actually required for rated speed or acceleration operation at a given hoistway position, elevator direction, and load, with the current which is predicted to be required for such conditions. According further to the invention, the predictions are made from baseline measurements of motor torque current at specific positions of the hoistway when traveling in a specific direction, with various loadings. The loadings may, for instance, be confined to zero load and rated load, if desired.

In accordance with the invention, the torque capability of the brake is checked by providing a major fraction of current previously required in a baseline measurement in order to cause motion of the car against a fully engaged brake; if the car moves with, for instance, 90% of the previously determined current required to move the car against the engaged brake, a requirement for brake service is noted, with or without immediate shutdown of the elevator, as is deemed suitable in any implementation of the present invention. According further to the invention, the baseline current is determined by causing the elevator to move in a particular direction with a previously determined loading, such as in the up direction when the car is empty, at a time when the brake is known to be operating with proper capability, such as at or soon after the initial installation of the elevator or refurbishment of the brake.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
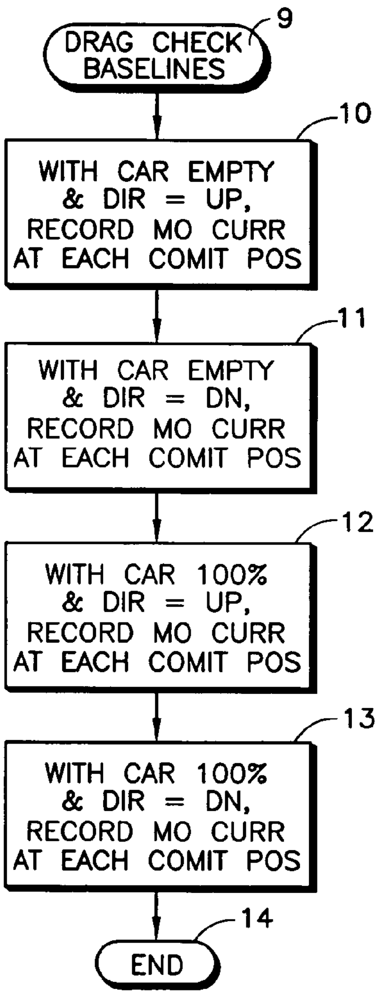
FIG. 1 is a macro flow chart illustrating a setup routine to determine the baseline measurements for checking the drag of the elevator brake.

Referring to FIG. 1, the baseline currents for the drag check according to the invention are provided in a series of routines reached through an entry point 9 which are performed prior to or soon after the elevator goes into service, or a thorough brake refurbishment has occurred. These routines are called into operation by service personnel at an appropriate time and under appropriate circumstances. A first routine 10 is performed with the car empty and the direction up. As the car moves up, the motor current is recorded at each floor commitment position (that is, the final position along the route of travel at which the car could commit to stopping at the next floor), or, if desired, the motor current could be recorded every three meters, or in some other defined way which is deemed suitable in any implementation of the present invention. Although the predetermined positions in this embodiment are taken to be floor commitment positions, which are different for the upper direction than for the down direction, if other positions are chosen, such as every ten meters in either the up or down direction, the predetermined positions for the up direction may be the same as the predetermined positions for the down direction. A routine 11 will be performed with the car empty and the direction set for the downward trip; the motor current is then recorded at each of a plurality of selected positions, such as each floor commitment position.

In another routine 12, the car is provided with 100% of rated load (utilizing portable weights, as is known in the art), or some other suitable percentage of weighted load as may be deemed to be best in any implementation of the present invention. Then as the car travels up under load and the motor current is recorded at a plurality of selected positions, such as at each floor commitment position. Similarly, the routine 13 will be performed with the car fully loaded in the downward direction, with motor current being recorded at each floor commitment position (or with such other loading and at such other positions as are selected for the routines). When the recordation of baseline currents is complete, these routines end, as at 14. In the usual case, the routines of FIG. 1 need only be performed on occasion, to account for normal variations due to use and wear, or whenever there has been a maintenance action which could alter the required motor currents.

Figure 2:
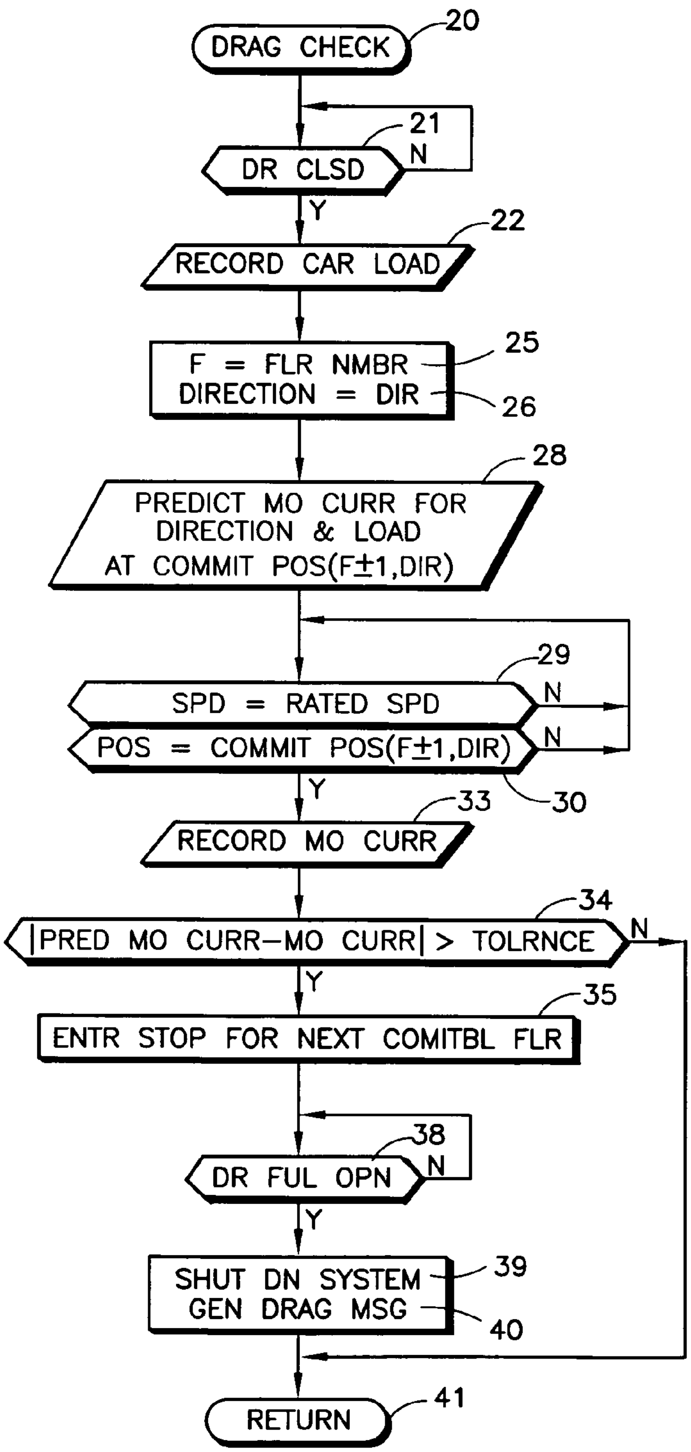
FIG. 2 is a simplified, high level functional chart of a routine which may be utilized periodically for checking brake drag by comparing motor current to baseline motor current for the same conditions.

After the baseline currents have been determined, during normal use of the elevator, typically, within any normal run of the elevator, the motor current is checked to see if it is within some tolerance of the baseline current for like conditions. A methodology for performing the drag check may take a form somewhat like the routine illustrated in FIG. 2. Therein, a routine is reached through an entry point 20 and a first test 21 determines if the elevator door is closed. If not, the routine will loop around test 21 until the door does become closed. Then, the car load is recorded by a subroutine 22. In a step 25, a floor indicator, F, is set equal to the floor number of the floor that the car is about to leave. And then a direction flag is set equal to the elevator car direction (DIR) in a step 26. A subroutine 28 then predicts the motor current for the direction and load determined in the routine 22 and step 26 at the commitment position for the next floor in the direction that the car will travel which is either +1 or −1 depending on whether the car is going up or down (F±1,DIR). If the baseline currents are established only for no load and rated load, then interpolation will be made for the percentage of rated load that was recorded in the subroutine 22, for the current direction of motion and the particular commitment position for the next floor. As is known, a very small amount of motor current is required to move a 50% load at rated speed, and higher currents of one direction are required to move a less than half full car down or a more than half full car up, and currents of an opposite direction are required to move a more empty car up or a more full car down.

The program reaches a pair of tests 29, 30 that check that the car has reached rated speed and is at the commitment position for the next floor in the direction the car is traveling. When that happens, an affirmative result of both tests reaches a subroutine 33 to record the motor current. Then a test 34 determines if the absolute value of the difference between the predicted motor current and the actual motor current is more than some tolerance value. If it is, a step 35 will enter a car call stop for the next committable floor (the next floor that the car could stop at). Once the car has stopped, the door will eventually become fully open and an affirmative result of a test 38 will reach a pair of steps 39, 40 to shut the elevator system down and to generate an error message indicating that there is excessive drag on the elevator. Then other programming is reverted to through a return point 41.

The routines just described are exemplary and not necessarily indicative of the manner in which the invention must be practiced. Many variations in the routines may be made so long as there are predetermined baseline currents against which current measurements can be compared, with or without interpolation or extrapolation of one or more parameters, to detect a sufficient difference from the baseline that would be indicative of brake or other undesired drag.

In the foregoing example, motor current at rated speed is used as the parameter; checking it at a known point in the hoistway is required so as to accommodate the weight differential for cables and the like in the hoistway which are dependent upon the position of the car within the hoistway. Checking current at rated speed when the car is at a particular position is one of a plurality of predetermined steady motor current conditions, because the current at rated speed is liable to have stabilized and be relatively steady, and the current required for a given load at a particular point in the hoistway should be the same each time. Another way the invention may be practiced is to record the motor current during acceleration from a particular floor; the floor from which the car is accelerating is the positional information which is necessary, and measuring the current after the car has been able to reach steady state acceleration is the other predetermined condition. Thus, the motor current at a plurality of predetermined steady motor current conditions is defined herein to include measuring the motor current during acceleration from a particular floor and measuring motor current at rated speed when at a particular position.

Another dynamic check which may be made in accordance with the invention is whether or not the brake, including its springs, alignments, and mechanical motion capability are such as will provide an adequate braking torque. This is done by establishing the amount of motor current which is required in order to move the elevator against the action of the brake when engaged, under the condition of a new or newly refurbished brake which is known to perform adequately. Then, periodically, the motor is provided with a significant fraction of the predetermined current, and if the elevator actually moves under that fraction of the predetermined current, the brake is presumed to have deteriorated to a notable state requiring service, and appropriate action can be taken.

Figure 3:
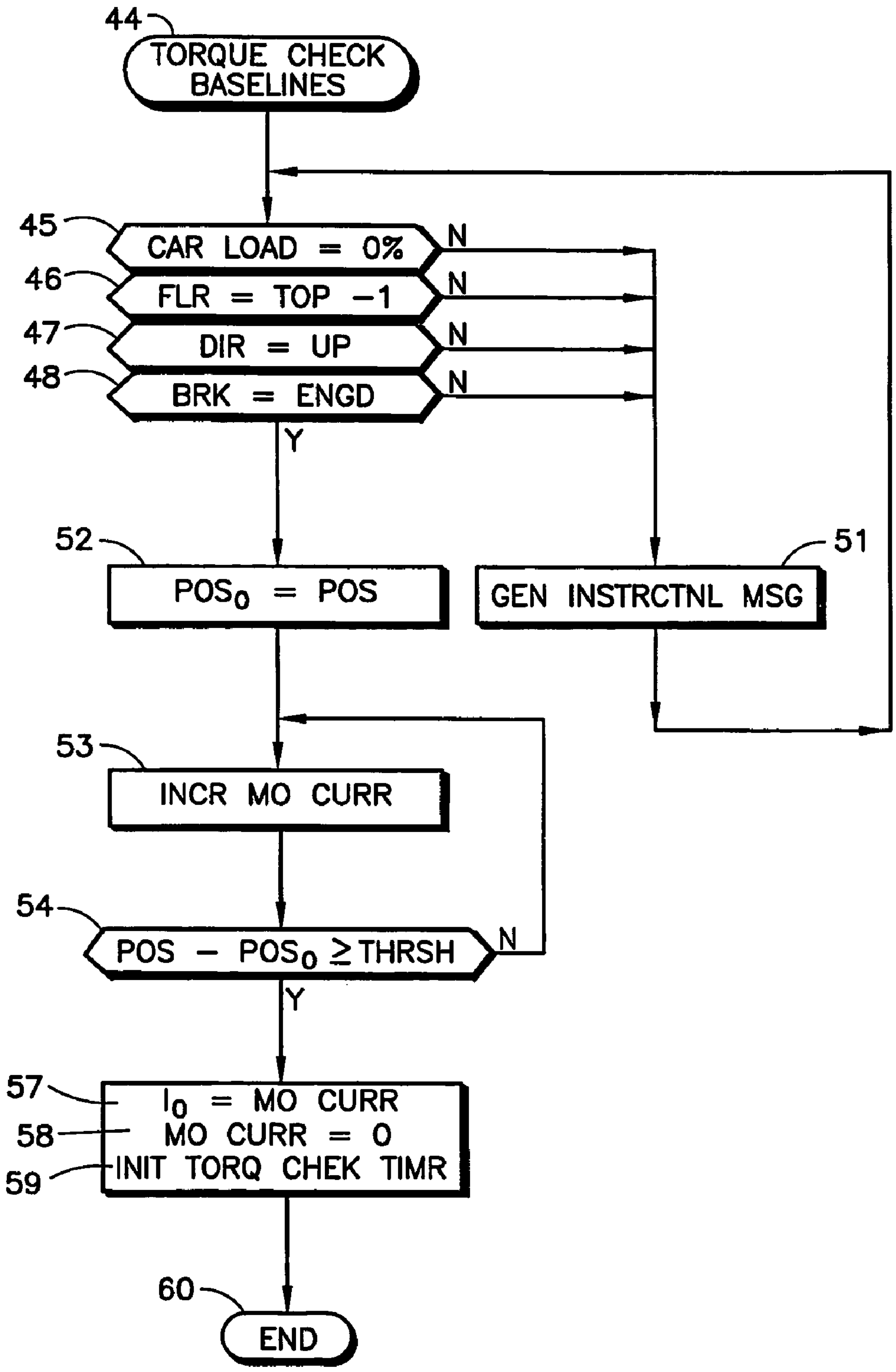
FIG. 3 is a high level simplified, illustrative flow chart of a routine which may determine baseline brake torque motor current.

A routine to determine the baseline current may take any suitable form, such as the routine illustrated in FIG. 3. Therein, the routine may be entered through an entry point 44 and a series of tests 45-48 will determine if the car is empty and located the second floor from the top, if the direction is up and the brake is engaged. If any of these is not true, a negative result will reach a step 51 to generate an instructional message for service personnel who are conducting the baseline process. When all of these conditions have been met, affirmative results will reach a step 52 which sets the baseline position, $POS_0$, equal to the car position, as indicated by the primary position transducer, or the equivalent. Then, the motor current is incremented in a step 53 and a test 54 determines if the difference between the present position of the car and the baseline position of the car is equal to or exceeds a threshold, which may be on the order of a few millimeters. If not, the step 53 is reached to increment the motor current again, and test 54 is repeated. When the car finally moves by some small threshold amount, an affirmative result of test 54 causes a step 57 to set the baseline current, $I_o$, equal to the present motor current, a step 58 to restore motor current to zero, a step 59 to initiate a torque check timer (described with respect to FIG. 4, hereinafter, and the routine ends at a point 60.

Figure 4:
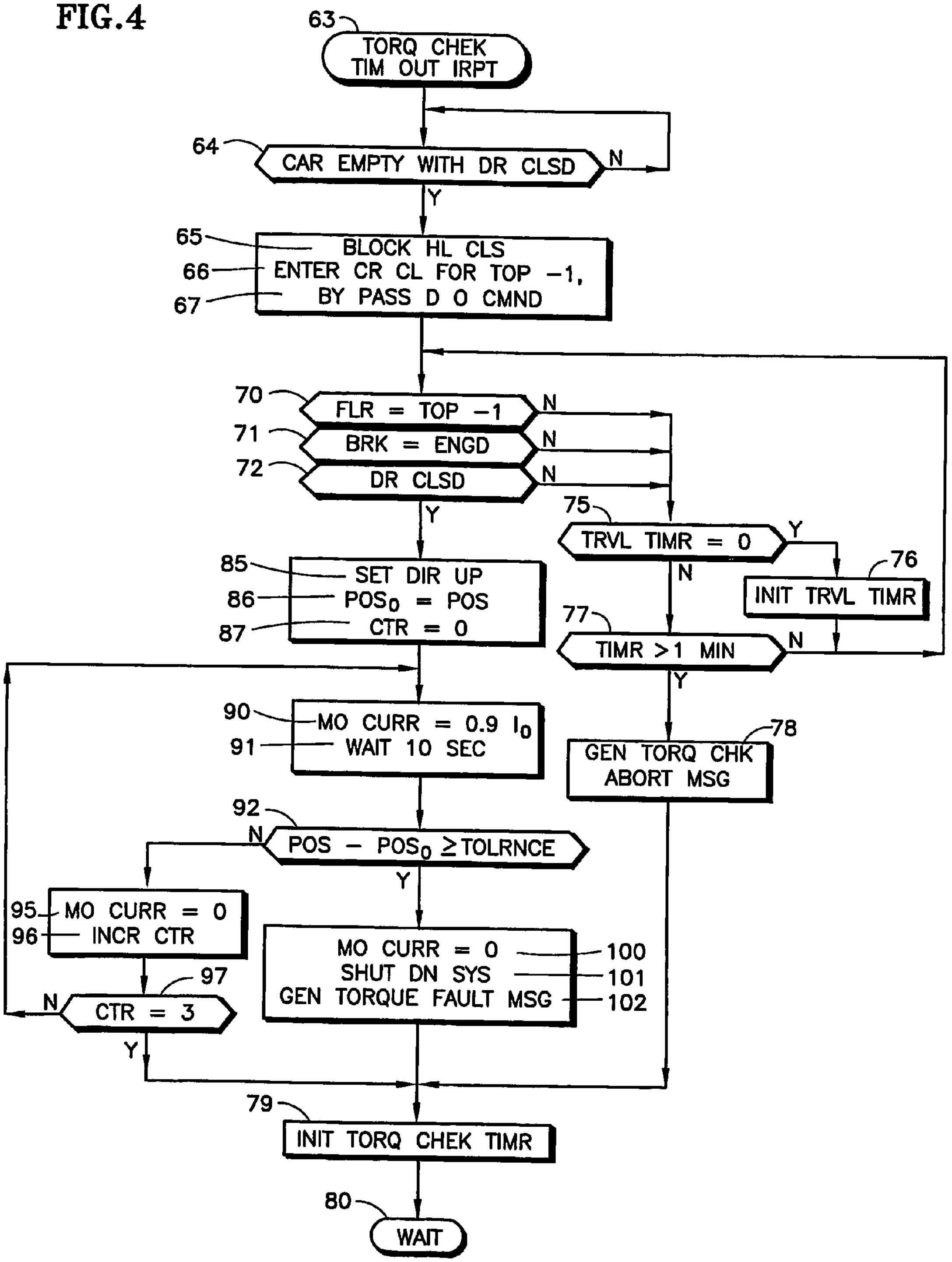
FIG. 4 is a high level simplified, illustrative flow chart of a routine which may determine reduced brake torque capability by moving the elevator with a motor current which is a fraction of the baseline current.

The brake torque capability may be checked utilizing a significant fraction of the current determined necessary to move the car against the brake when engaged, by any number of processes, one of which may resemble that illustrated in FIG. 4. Therein, the routine may be reached through an entry point 63 that is reached when the torque check timer, initiated in step 59 of FIG. 3, times out. Then, a step 64 causes the routine to wait until the car is empty with the door closed. This is a condition which may cause the car to become parked, in some circumstances. In this condition, it is known that the car is available and it is empty. When that occurs, a step 65 blocks all the hall calls, a step 66 enters a car call for the next to top floor (TOP-1), and a step 67 causes the door open command to be bypassed.

Then, the routine will wait until a test 70 indicates that the car is at the top floor, a test 71 indicates that the brake is engaged, and a test 72 checks that the door is still closed. Initially, as the car moves upwardly, test 70 will be negative reaching a test 75 to determine if a travel timer has been initiated, or not. If the travel timer is set at zero, this means it has not yet been started and a positive result of test 75 will reach a step 76 to initiate the travel timer. Then the program reverts again to test 70. Again, test 70 will be negative in the second pass and will again reach test 75 which this time is negative because the timer has been initiated. A test 77 determines if the timer has reached one minute or not. Initially it will not, so the program reverts to test 70 one more time. This continues until either all of the tests 70-72 are affirmative or a time of one minute has elapsed. If the timer reaches one minute, an affirmative result of test 77 reaches a step 78 to generate torque check abort message, after which a step 79 initiates the torque check timer again and the routine goes into a wait state 80 pending receipt of the next torque check timeout interrupt.

If, before one minute elapses, the car is sitting at the top floor with the brake engaged and the doors still closed, an affirmative result of tests 70-72 reaches a step 85 to set the direction of the elevator to up, a step 86 to set a beginning position, $POS_0$, equal to the current position of the elevator in the hoistway, and a step 87 sets a counter to zero. Then, a step 90 sets the motor current equal to 0.9 (or some other selected major fraction) times the baseline current, $I_0$, established in step 57 of FIG. 3. The routine then waits ten seconds to allow the motor current to be provided and have an effect, in a step 91, and then a test 92 determines if the car has moved by comparing the difference between the current position and the initial position to see if that difference exceeds some tolerance, which may be a few millimeters. If the car has not moved more than the tolerance amount, a negative result of step 92 reaches a step 95 to reduce the motor current to zero and a step 96 to increment the counter to indicate that one test has been provided. A test 97 determines if the counter has reached three; initially it will not so the program reverts once again to the steps 90 and 91 to provide current to the motor and test 92 to see if the car has moved more than a tolerance amount. If the car moves, an affirmative result of test 92 reaches a step 100 which restores motor current to zero, a step 101 which shuts the system down, and a step 102 which generates a torque fault message. Then, the torque check timer is initiated in step 79 and the routine goes into a wait state 80, pending the next torque check timeout interrupt.

If after three tries, the car has not moved, an affirmative result of test 97 will bypass the steps 100-102, reaching the step 79 to initiate the torque check timer and then going into the wait state 80.

We claim:

1. A method of checking for excessive drag in an elevator system having a car moveable in a hoistway, characterized by:

initially, establishing baseline currents while the elevator car is operating properly with no drag, by:

(a) with the car either empty or carrying a load which is a small fraction of rated load, recording (10) a motor current at a plurality of predetermined steady motor current conditions while moving the car upwardly, and recording (11) a motor current at a plurality of predetermined steady motor current conditions while moving the car downwardly;

(b) with the car carrying a load which is either 100% or a high fraction of rated load, recording (12) a motor current at a plurality of predetermined steady motor current conditions while moving the car upwardly and recording (13) a motor current at a plurality of predetermined steady motor current conditions while moving the car downwardly;

then, during normal operation of the elevator car over time, during at least some normal runs of the elevator car, comparing the motor current used to operate the car with motor current predicted to be required to move the car under its present load, direction and position in the hoistway, by:

(c) when the doors are closed (21) at the beginning of a run, recording (22) an actual car load, a current floor number (25) and direction of the car (26), and from that and the currents recorded in steps (a) and (b), predicting (28) the motor current required at one of said predetermined steady motor current conditions, including said actual car load and said direction of the car, related to said current floor number;

(d) recording (33) an actual motor current at said one of said predetermined steady motor current conditions; and (e) if said actual motor current exceeds a predicted motor current by a tolerance value (34), shutting down the elevator car (39) at the next committable floor.

2. A method according to claim 1 wherein said step (e) further comprises: generating (40) a drag message for service personnel.

3. A method according to claim 1 wherein:

said steps (a) and (b) comprise:

with the car moving at rated speed, recording (10-13) the motor current at each of a plurality of predetermined positions of the car in the hoistway; said step (c) comprises:

predicting (28) a motor current required to move the car at rated speed past the next one of said predetermined positions for said direction; and said step (d) comprises:

recording (33) the motor current when the car is traveling at rated speed (29) at said next one of said predetermined positions (30).

4. A method according to claim 3 wherein:

said predetermined positions are floor commitment positions (30).

5. A method of checking for effective brake operation in an elevator system having a car moveable in a hoistway, comprising:

(a) first, determining (57) a baseline amount of motor current required to move the elevator (54) car a small threshold amount, under certain conditions comprising position (46), load (45) and direction (47), with the brake engaged (48), when the brake 20 is known to be in proper operating condition; and (b) thereafter, periodically determining whether a high fraction of said baseline amount of current (90) is capable of moving the elevator car by more than a small tolerance amount (92) under the same said certain conditions (70-72, 85); and (c) if the car does move by more than said tolerance amount in said step (b), generating (102) a torque fault message for service personnel.

6. The method according to claim 5 wherein, if said torque fault message is generated in step (c), shutting the elevator system down (101).

7. The method according to claim 5 wherein said steps (a) and (b) are performed with the car under minimal load (64).

8. The method according to claim 5 wherein said certain conditions include the car being at or near a top floor (46; 66) with no load (45; 64) and its direction of motion being up (47, 85).

9. A method of checking for excessive drag and for effective brake operation in an elevator system having a car moveable in a hoistway, characterized by:

initially, establishing baseline currents while the elevator car is operating properly with no drag, by:

(a) with the car either empty or carrying a load which is a small fraction of rated load, recording (10) a motor current at a plurality of predetermined steady motor current conditions while moving the car upwardly, and recording (11) a motor current at a plurality of predetermined steady motor current conditions while moving the car downwardly;

(b) with the car carrying a load which is either 100% or a high fraction of rated load, recording (12) a motor current at a plurality of predetermined steady motor current conditions while moving the car upwardly and recording (13) a motor current at a plurality of predetermined steady motor current conditions while moving the car downwardly;

then, during normal operation of the elevator car over time, during at least some normal runs of the elevator car, comparing the motor current used to operate the car with motor current predicted to be required to move the car under its present load, direction and position in the hoistway, by:

(c) when the doors are closed (21) at the beginning of a run, recording (22) an actual car load, a current floor number (25) and direction of the car (26), and from that and the currents recorded in steps (a) and (b), predicting (28) the motor current required at one of said predetermined steady motor current conditions, including said actual car load and said direction of the car, related to said current floor number;

(d) recording (33) an actual motor current at said one of said predetermined steady motor current conditions;

(e) if said actual motor current exceeds the predicted motor current by a tolerance value (34), shutting down the elevator car (39) at the next committable floor;

(f) determining (57) a baseline amount of motor current required to move the elevator (54) car a small threshold amount, under certain conditions comprising position (46), load (45) and direction (47), with the brake engaged (48), when the brake 35 is known to be in proper operating condition;

(g) after step (I), periodically determining whether a high fraction of said baseline amount of current (90) is capable of moving the elevator car by more than a small tolerance amount (92) under the same said certain conditions (70-72, 85); and (h) if the car does move by more than said tolerance amount in said step 5 (b), generating (102) a torque fault message for service personnel.

* * * * *